July 19, 1932.   R. SALOMON   1,868,397
MACHINE FOR THE DRAWING OF GLASS INTO TUBES OR RODS Filed July 14, 1928   5 Sheets-Sheet 1

Fig. 1.

Inventor:
Robert Salomon,
by Langner, Parry, Card & Langner
Attys.

July 19, 1932. R. SALOMON 1,868,397
MACHINE FOR THE DRAWING OF GLASS INTO TUBES OR RODS
Filed July 14, 1928 5 Sheets-Sheet 2
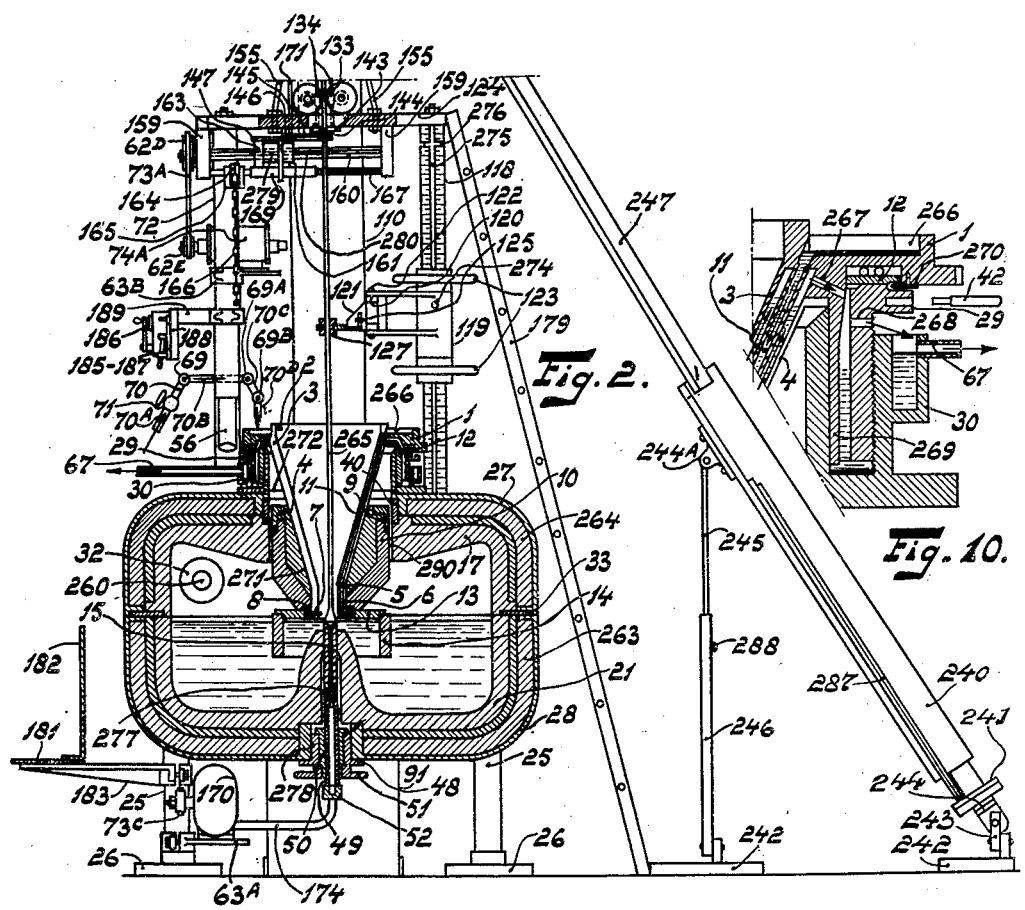
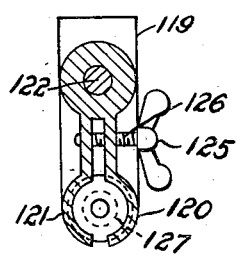
Inventor:
Robert Salomon,
by Langner, Parry, Card & Langner
Attys.

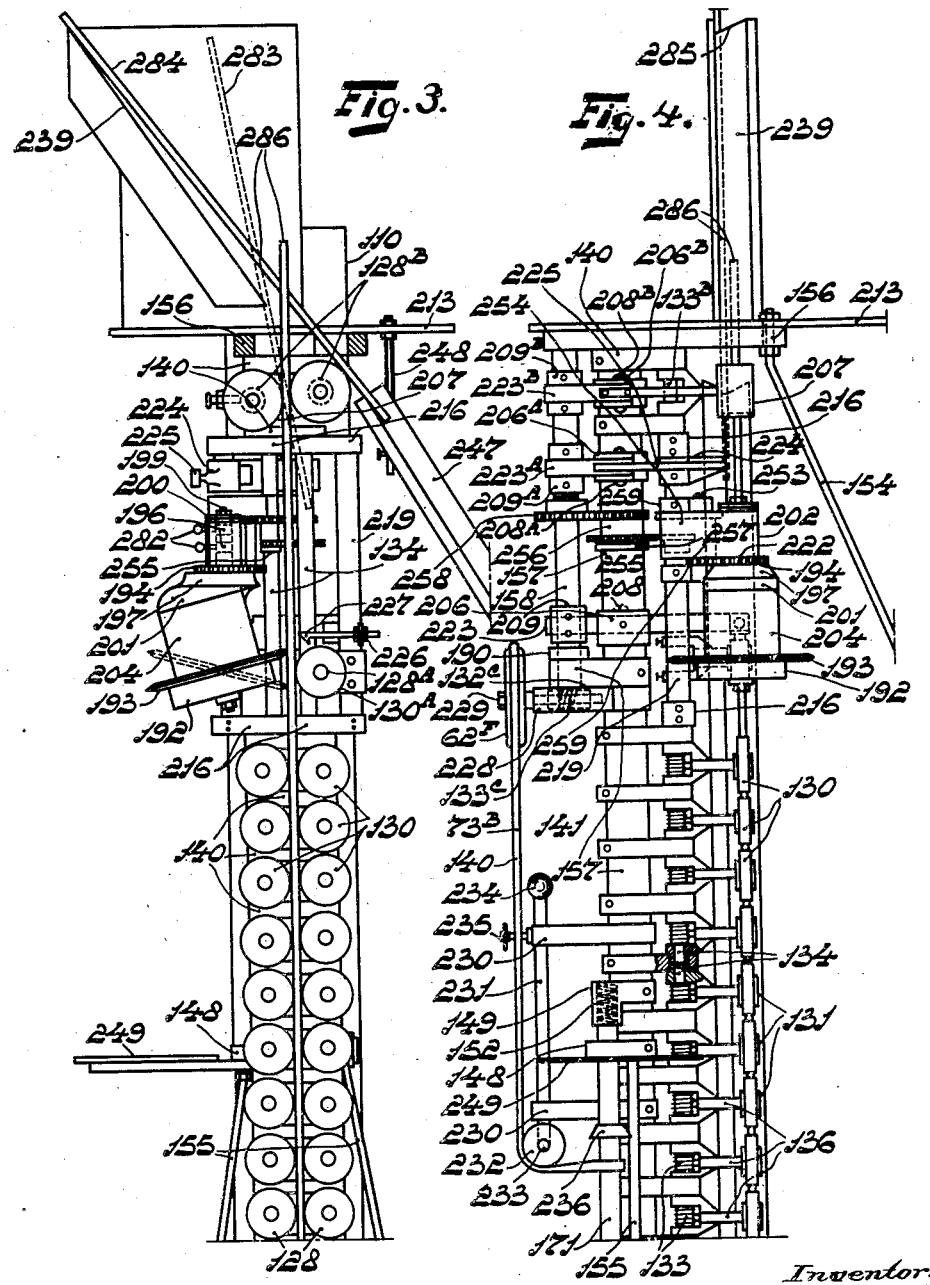

July 19, 1932.   R. SALOMON   1,868,397
MACHINE FOR THE DRAWING OF GLASS INTO TUBES OR RODS
Filed July 14, 1928   5 Sheets-Sheet 4

Inventor:
Robert Salomon,
by Langner, Parry, Card & Langner
Att'ys.

July 19, 1932.    R. SALOMON    1,868,397
MACHINE FOR THE DRAWING OF GLASS INTO TUBES OR RODS
Filed July 14, 1928    5 Sheets-Sheet 5
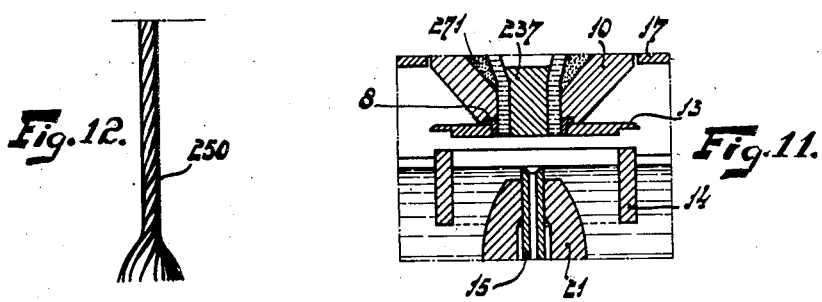
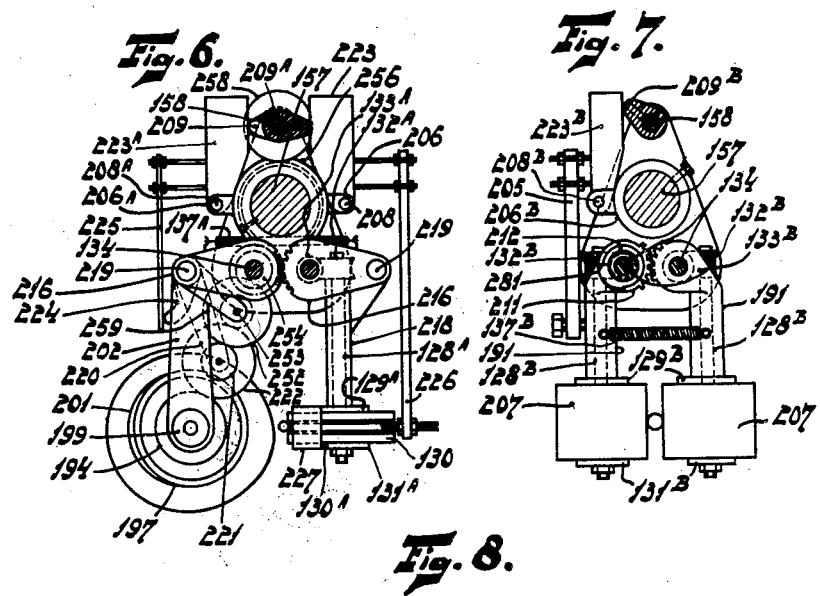
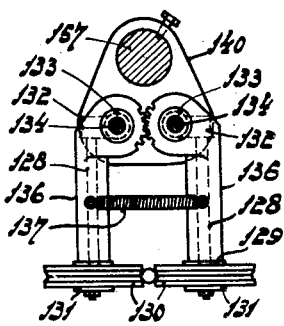
Inventor:
Robert Salomon, Patented July 19, 1932

1,868,397

UNITED STATES PATENT OFFICE

ROBERT SALOMON, OF NEUILLY SUR SEINE, FRANCE

MACHINE FOR THE DRAWING OF GLASS INTO TUBES OR RODS

Application filed July 14, 1928, Serial No. 292,743, and in France October 11, 1927.

The present invention relates to a machine for the drawing of glass into tubes or rods, which comprises a drawing device by which the tubes or rods are drawn from a bath of glass or from a rotatable mandrel or cylinder. The object of the invention is to improve the said drawing apparatus.

The glass-drawing apparatus, the subject-matter of the present invention, comprises one or more pairs of rollers between which the tube is held at a pressure depending upon the resistance offered to the drawing.

According to one form of construction, the rollers which serve for this purpose are mounted upon levers rotatable on axles situated at the exterior of the axles of the said rollers, the device being driven by a worm concentric with the point of pivotation and engaging a worm-wheel keyed to the axle of the roller.

The said machine may comprise a device for cutting off the tubes or rods. The said device comprises a cutting wheel whose shaft is inclined from the axis of the drawing operation, said wheel being mounted upon a support rotatable on an axis which is substantially parallel with the drawing axis. The said wheel is rapidly rotated by a motor, and while cutting the tube it will also follow the same in its movement. In order to act on the tube by the wheel during the drawing process, the said wheel may co-operate with a pressing roller, and the cutting wheel with its support on the one hand and the said roller on the other hand may be mounted upon respective levers which move from or towards one another at stated intervals. The device controlling the said levers may be made adjustable in position whereby the period of the motion of said levers may be properly determined and hence the length of the tubes or rods which are formed may be changed.

For the proper discharge of the tubes or rods after they have been cut off, there are provided according to the invention suitable rollers whose peripheral speed exceeds or equals the speed of the tubes or rods in continuous travel, and which are so disposed that the detached tubes or rods will be brought into the proper position for their discharge and will thus be inclined from the drawing axis.

The appended drawings show by way of example a constructional form of the said machine.

Figure 1 is an elevational view of the entire apparatus, with a partial section of the lower part of the machine, that is to say the part of the machine carrying the tube-drawing device.

Figure 2 is a side elevational and sectional view corresponding to Figure 1.

Figures 3 and 4 are respectively two views, in elevation and in section, of the glass-drawing mechanism.

Figures 6, 7 and 8 are plan views of the mechanism for drawing and for cutting off the tubes.

Figure 9 is a horizontal section showing a construction of the device for calibrating the tubes.

Figure 10 is an axial section of the upper part of the furnace, showing the disposition of the drawing well upon the furnace.

Figure 11 is an axial section of the lower part of the drawing well.

Figure 12 shows a portion of metallic cable, which serves to start the glass-drawing operation.

Figure 5:
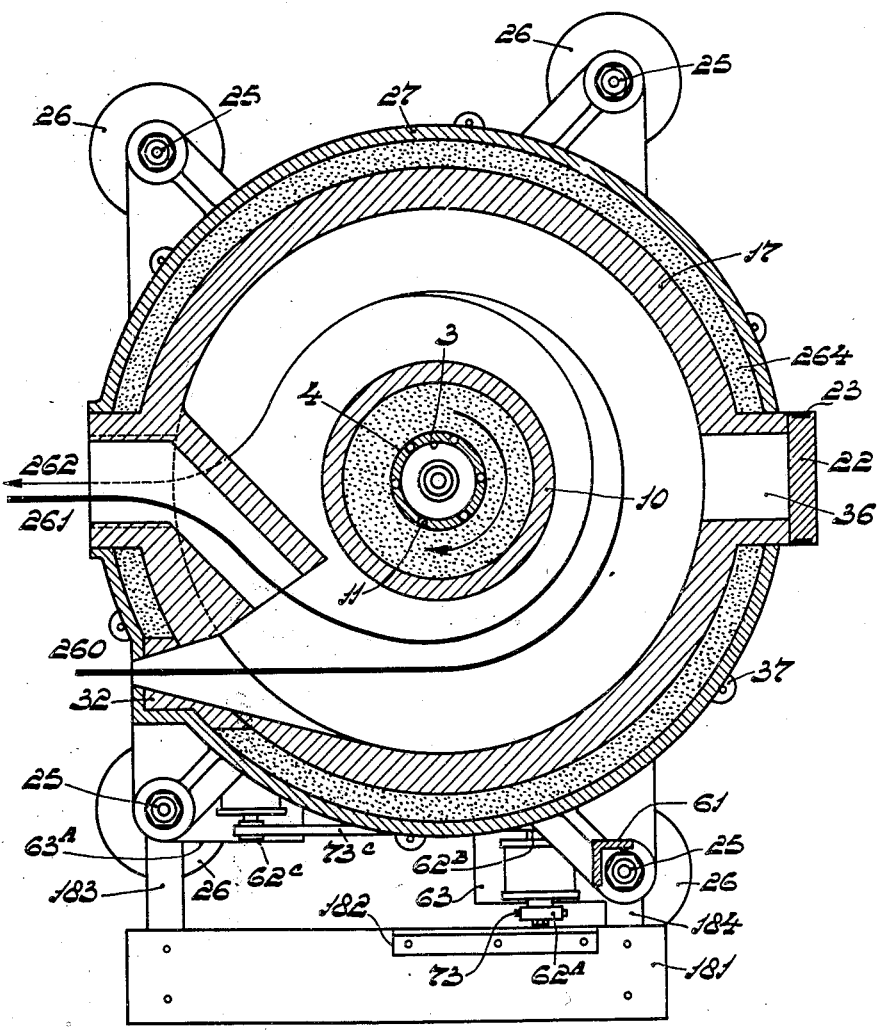
Figure 5 is a horizontal section of the furnace at the level of the drawing door.

As above stated, the said furnace is divided into two parts. The lower part (see Figure 2), comprises a chamber or hearth 21 which has the form of a body of revolution and consists of refractory material 263 disposed in an external recipient 28. Rising from the central portion of the hearth 21 is a substantially vertical boss with sloping sides. The upper part of the furnace comprises the refractory roof portion 17 which is mounted, through the medium of the refractory lining 264, in an external envelope or casing 27. The said lining 264 is introduced into the space between the casing 27 and the roof portion 17, through apertures which are normally closed by the covers or plugs 47 (Figure 1). A sleeve 40 and an annular packing member 33, both disposed against the casing 27, provide for the tight assembling of the parts at the top of the furnace. The roof piece 17 is apertured at four different points for the following purposes. (1) It is apertured at 36 to form the opening for loading the material into the furnace this being provided with a door 22 (Figure 5). (2) It is apertured to allow the flame of a burner 260 to enter the furnace. (3) It is apertured for the exit of the smoke and like products of combustion at 262 (Figures 1 and 5). (4) It is further apertured at 261 to provide for the admission, into the roof space, of the additional air for the combustion of the gas of the burner.

The upper envelope or casing 27 supports the major part of the elements of the machine. It is itself mounted upon the uprights 25, four in number in the present example, which are mounted on the base plates 26 (Figures 1 and 2). The melting hearth 21 is secured to the upper part of the furnace by the rods such as 44, whose threaded ends are held by nuts upon the straps 37 attached to the pins or studs 43 of the casing 27. The casing 28 is also suspended, by the engagement of the studs 43 which it carries, in the eyes of the traction rods 44. In this manner, the casing 28 may be readily in position. In fact, it will suffice for this purpose to suspend it by means of special traction rods, which are longer than the usual rods, and these are acted upon in order to raise the said casing (and the hearth) until it makes contact with the upper part of the furnace. The said casing being maintained for instance by three temporary traction rods, the normal traction rods are mounted on the studs 43 which are left free; the temporary rods are then removed and are replaced by the normal traction rods.

As above indicated and as illustrated in Fig. 1, the additional air for the supply of the burner 260 is delivered through the earthenware conduits 90 disposed in a chamber situated between the refractory members 103—104—105—289 which are held in an external sheet metal casing 91. The said conduits are constantly heated by the products of combustion which issue from the outlet 262 and pass through the stack 110 which is mounted by the base 111, upon the general heating apparatus; said stack is provided with a register 113 whose axle 112 is controlled from the exterior by a handle 114.

The operation of the said furnace is as follows:—

The glass which is already in the pasty condition, or the composition which is to produce the glass by its fusion, is delivered into the chamber or hearth 21 through the loading aperture 36 of which the door 22 has been removed. This latter (see Fig. 1) consists of a block of refractory material suspended by a metallic belt 23 from a chain 24 which is attached to the end of a lever 79 pivoted at a fixed point 84 of the upright 78, the end of said chain being attached to the end of a lever 77 carrying a counterweight 81 and pivoted at 83 to the end of an arm 76 rigidly secured to the upright 78.

The ladle or shovel by which the material is loaded is supported by its handle upon the lower end of a rod 80 which is mounted on the end of the lever 77. The said door is simultaneously raised and removed from the charging hole by the lever 79. A stop piece consisting of a rod 85 which is adjustable with reference to the stationary arm 76 will determine—by means of the stud 82 of the lever 79—the lifting height of the door which can thus be readily moved without friction on the edges of the said charging hole. A facing plate 36 protects the annular packing member 33 (Figure 2) against all friction or shocks.

The complete combustion of the gas of the burner is assured, as above stated, by a supply of additional air at 261, which is heated by the heating device 91. The path of this additional air is shown in Figure 1 by the arrows in dot-and-dash lines, and in Figure 5 by the arrow 261. The products of combustion issue from the furnace at 262 and enter the smoke box or heater 91. The draught is assured by a register 113 whose operating handle 114 can be fixed in any desired position by suitable means such as the brake 115 (Figure 1).

The supply of additional air may be regulated by the register 98.

A door 106 serves to discharge the dust and soot which may accumulate in the said stack.

The operating region from which the glass is drawn out is bounded by a partition wall 14 of refractory material which floats in the melted bath; when rotating, the said wall serves to maintain the pasty material against the walls of the chamber 21, so that the glass attaining the centre of the chamber will always be homogeneous.

The tubes or rods are drawn from the surface of the bath situated within the said partition; the temperature of this surface is maintained at the proper degree by a refractory disc 13 which is imperforate or if necessary may be pierced with suitably spaced apertures. The said disc 13 is not secured to the partition but is simply placed in contact therewith at its upper edge when it is raised by the bath of glass in which it floats. With this arrangement (Figure 11) if a recess is formed in the lower edge of the disc, the flame may enter the interior of the partition wall in order to heat the glass in the drawing region after a long stopping period, or when starting the operations. When the work is stopped, it is useful to close up the lower part of the drawing well by a plug 237 in such manner that the flames will be prevented from entering the well and from thus over heating the metallic parts situated above the latter. The said plug, consisting of refractory material, is removed upon resuming the work, by means of a suitably disposed handle (not shown) which may be screwed or otherwise secured to the same. At this time, the melted bath will again bring the partition wall 14 against the disc 13.

The glass-drawing operation is started by immersing the expanded end of a metallic cable 250 (Figure 12) into the bath. The tubes or rods must be rapidly cooled, shortly after entering the drawing well, so as to avoid a reduction in the diameter during the drawing process to such a degree as to prevent the action of the calibrating device. For this purpose, the tapered chamber which bounds the drawing well is suitably cooled. The water jacket for this purpose is formed by connecting for instance by autogenous welding the members 5—6—3—4—11—1 in such manner as to form a water jacket.

As shown in Fig. 2, the cold water is supplied through the conduit 70 A, upon which is mounted the regulating cock or valve 71; it passes through the conduit 70, the pivoted coupling 69, the conduit 70 B, the pivoted coupling 69 A, the conduit 70 C, the pivoted coupling 69 B, and flows into the annular groove 266. The various pivoted couplings serve to properly direct the water supply or to withdraw the conduit 70 D, in order to remove the drawing well or the rotatable wall. From the annular groove 266 formed in a disc 1 (Figure 10) the water flows in the tubes 11 to the bottom of the space (Figure 2) and then, on the thermosiphon principle it rises and flows through a series of holes 267 into a fixed annular groove formed in the member 30. A constant level is established in the said groove in virtue of the overflow holes 268 formed in the member 29. The water thus overflows into the discharge conduit 67 which is coupled by a flange to the member 30.

A screwthreaded sleeve 29, provided with a flanged base having therein the radial holes 42 (Figure 10) into which may be introduced a working spindle is screwed into a tapped portion of the stationary member 30. The sleeve can thus be screwed or unscrewed to regulate the height of the said chamber or glass-drawing well, so as to bring the refractory disc 13 into contact with the refractory wall 14, as above stated. The lower part of the member 1 comprises an extension or cylindrical wall 269 (Figure 10) which is constantly immersed in the water contained in the groove of the member 30 and forms therewith a hydraulic joint by which the joint 290 (Figure 2) of the interior of the furnace is separated from the outer atmosphere.

In Fig. 10 the member 1 is shown mounted upon balls or rollers co-operating with a race or ring 12 supported by the threaded sleeve 29; the separately secured lugs 270 retain the said ring when the member 1 is raised with the said drawing well, when the furnace is taken apart.

The water-cooled drawing well is shielded from all contact with the flames by a refractory member or cylinder-conical block 10, maintained upon the said well by a ring screwed at 7 upon the latter, and by a ring 9. The bolts or screws 7 also hold the member 13, so that the latter may be disengaged when the apparatus is taken apart, and hence the ring 8 need not be removed and still continues to hold the member 10.

The region 272 is practically cold, and its temperature does not exceed 80 degrees C.

The support for the member calibrating the tubes or rods serves to maintain the drawing well when assembled or taken apart, and for this purpose the circular piece 127 (Figure 9) is replaced by a ring 64 (Figure 1) which prevents the jaws 120—121 from opening. As seen in Fig. 1, a screwthreaded rod 173 supports a member 172 which may be lowered by means of the hand-wheel 123 forming a nut mounted on the threaded upright 118 (Figure 2); said member 172 may thus be engaged with the pins or studs of the member 1 (Figure 2). For this purpose, the member 172 is cut out in order that it may pass by the said studs, and when it has rotated on its axis, it will offer an imperforate part to the said studs. When the member 1 is raised by the hand-wheel 123, the member 119 slides on the upright 118 with which it is angularly connected by a key movable in a longitudinal groove in the upright 118. When the said key rises as far as the releasing point 276, the member 119 may rotate upon the said upright in such manner as to bring the whole device representing the drawing well to the outside of the furnace whereby the latter will be entirely disengaged for inspection purposes.

It will be remarked that the internal envelope of the two parts of the furnace consists of a rigid refractory lining, in one or two pieces, and of a relatively reduced thickness, surrounded by a filling of refractory powder, thus facilitating the expansion and contraction due to temperature variations, whereby all danger of breakage will be obviated.

As will be seen from an examination of Fig. 1 rotation of the member 1 and hence of the said drawing well is effected by an electric motor 74 mounted on a support 63 which is maintained by the rods 25. On the motor shaft is mounted a pulley 62 A connected by a belt 73 with a pulley 62 which acts—through the worm 75 and worm wheel 59 mounted on a support 58—to operate the long-toothed pinion 56 engaging teeth formed on the periphery of the member 1. The gear engagement is thus maintained at all heights of the member 1 these being regulated by the sleeve 29, as above specified. The current to the said motor is controlled by a switch 185 (Figure 1).

The drawn glass piece 15 may be moved vertically by the hand-wheel 51 (Figure 2) keyed to a member 50 forming a nut upon the threaded tube 49. The nut 50 when rotating will raise or lower the tube 49 which is held against rotation by the conduit 174 (this being slightly flexible) with which it is connected. The whole device is maintained by a member 48 which is rigidly secured to the casing 28 of the hearth or chamber. The conduit 174 is supplied with air under pressure by a blower 170 which is mounted on a support 63 A and is controlled by the motor which drives the rotating member 1. For this purpose, the belt 73 C connects together the two pulleys 62 C and 62 B (Figure 1). The air delivered through the tube 49 (Fig. 2) and the member 15, is thus supplied under pressure to the tube which is being drawn out, and the pressure is regulated by the discharging needle valve 53 (Fig. 1). With the aforesaid arrangement, it is observed that in order to replace the member 15, it is simply necessary to place under it a new member and to push the whole into the interior of the furnace, without changing the level of the melted glass. During this operation, the air which is forced between the members 15 and 49 escapes through the orifices 278.

The device for calibrating the tubes may be vertically displaced by means of the handwheels 123 as above stated, in order to bring it into the most suitable position for obtaining any desired diameter of calibration. The said calibrating device may comprise small wheels or rollers by which the drawn tubes or rods may be given any desired outline. In the case of cylindrical tubes or rods, a simple calibrating ring 127 is sufficient. The said ring is made in two parts which are held between jaws 120 and 121 (Figure 9) which are pivoted on an axle 122 mounted in a support 119, and are brought together by means of a wing nut mounted on a bolt 125 and acting through the medium of the spring 126. Preferably, the head of the bolt 125 may be disposed by a bayonet joint upon the jaw 121 so that the said bolt can be removed without requiring the entire removal of the wing nut. The ring 127 is closed upon the said tube at the start of the drawing operation, the contact being made at the lowest possible point on the tube.

The glass-drawing mechanism (see Figs. 3 and 4 and the top of Fig. 2) is mounted on a platform 124 supported by the uprights 118, 72 and 78. This mechanism permits to change the speed of the glass drawing during the work without stopping the machine. For this purpose the regulating of the speed is first approximately effected by a suitable choice of the pulleys 62 D—62 F among a series of different diameters. The axles 34 control the drawing motion, and their movement is assumed by a motor 74 A secured to a support 63 B adjustable along the upright 72 so as to regulate the belt tension. The motor drives the pulley 62 D by the belt 73 A and the pulley 62 E. The pulley 62 D drives the shaft 160 on which is slidable a pulley 161 keyed thereto; for this purpose, a key 279 is movable in a slot 280. The position of the pulley 161 on the shaft 160 is obtained by a nut 169 mounted on a threaded rod 167 whose rotation is obtained by a member 164 upon which is disposed the driving chain 166 held in a strap 165. The shaft 160 and the rod 167 are mounted in bearings 159. A leatherfaced roller 163 which is secured to the pulley 161 drives a friction disc 147 keyed to a shaft 171 which is movable in the base plate 124 and in the bearing 148 (Figure 4). The disc 147 is urged against the roller by a spring 152 placed in a recess in a member 149. This arrangement forms a progressive changespeed device of the friction type which can be readily regulated by the chain 166. A pinion 146 keyed to the disc 147 engages a pinion 145 for the drive of the shafts 134 by means of the pinions 143—144, so as to give these shafts contrary rotations.

The motor 74 may rotate either way by means of a controlling and reversing switch 187. When rotating in one direction it draws out the glass, and when rotating in the other direction it allows of lowering the starting piece 250 into the mass of glass when this piece is engaged between the drawing rollers.

All of the drawing rollers are placed in superposed pairs and operate in like manner. In Figs. 6, 7 and 8, it will be noted that to the shafts 134 are keyed the worms 133 engaging worm wheels 132 mounted on shafts 128 disposed in the bearings 135. These latter are pivoted to the shafts 134 with reference to supports 140 mounted on the upright 157. The washers 129 are secured to the shafts 128 and the asbestos discs 130 forming the drawing rollers are held between the washers 129 and 131. The worms 133 whereof one turns to the right and the other to the left, drive said rollers while bringing them towards one another with a force depending upon the drawing force. The said rollers are also urged together by a spring 137. The supports 136 are provided with toothed parts concentric with the shafts 134, which are engaged, and thus assure the drawing on an accurately determined axis. The drawing pulleys or rollers 130 are provided with grooves whose shape and depth vary with the diameter of the tubes or rods to be drawn; however, the elastic return of the said rollers permits the passage of the said starting piece 250 whose diameter exceeds that of the tube to be drawn. The shafts 134 are made in several sections and are cut out on a diameter and are connected by a member provided with two perpendicular studs (Figure 4) in order to form a Cardan joint whereby the movement may be transmitted from one piece to the other without danger of jamming.

The supports or bearings 140 are, as stated, mounted on the upright 157 which is rigidly secured to the plate 124 and held by the rods 154—155.

The device for cutting the tubes comprises a cutting disc 193 (see Figs. 3 and 4) mounted on the shaft of an electric motor 204 to which it is secured and which drives the disc at high speed. The parts are secured by a bell 192. The disc is mounted on the driving shaft, but this latter is mounted at its upper part in such manner that it may be secured in any position to the member 197. It is feasible for this purpose to use a ball-joint between the motor frame and the piece 197, with the addition of suitable means for holding the parts in the proper position (not shown). The axis of the cutting disc may be inclined from the drawing axis, (Figure 3). The device consisting of the motor 204 and the cutting disc 193 rotates on an axis which is preferably parallel with the axis of the drawing operation. This rotation is obtained as follows. A shaft 158 in constant rotation and in synchronism therewith, follows the drawing device, is connected, by the pinions 258—256—254—252—222, with the pinion 194 keyed to the member 197. The pinion 194 and the member 197 rotate with reference to a support 202 their shaft being held by a stop 200 provided with a retaining ring 199. The shaft 221 of the pinion 222 is supported by a member 220; the shaft 253 of the pinion 252 is supported by a member 259, and the pinion 254 is mounted loose on one of the shafts 134 and rotates in the same direction as the latter. A ring 255 supports the pinion 255; the pinion 256 is loose on the upright 157 and is in contact with a ring 257. The driving pinion 258 is keyed to the shaft 158 which carries the cam 209; the latter acts at each revolution of the shaft 158 upon a lever 223 A, pivoted at 208 A to a fixed member 206 A. The lever 223 A carries a spring (or elastic strip) 225 which is in constant contact with the end of a lever 224 angularly mounted on the arm 216 pivoted to one of the aforesaid shafts 134. To the other shaft 134 is pivoted another arm 216 carrying a rod 219 upon which is rigidly mounted a support 218 holding a roller 130 A keyed to a shaft 128 A guided in a support 218, and connected by a worm wheel 132 A—with a worm mounted on the shaft 134; the peripheral speed of the roller 130 A is thus equal to that of the drawing rollers 130. The two arms 216 are connected by toothed parts, concentric with the shafts 134, and constantly engaged, in such manner that their angular motion on the said shaft will be combined and will be exactly equal. A spring 137 A connects the two arms 116 (Figure 6) so as to maintain, in the absence of all external cause, the disc 193 and the roller 130 A separated from the tube which is being drawn. The roller 130 A serves to hold the tube in the region in which it is acted upon by the cutting disc 193.

Since the speed of rotation of the motor 204 and disc 193, with the pinion 194, is properly determined by a suitable choice of the pinions connecting said rotating device with the cam shaft, it is feasible to determine the moment of the cutting of the glass tube by the disc 193, and hence the lengths of such tubes. The disc acts on the tube by means of the said cam, at the time at which said disc is in the position shown in Figure 3. As the tube is drawn forward, the cutting edge of said wheel rises at the same rate, due to the rotation of the motor 204 and pinion 194; when the disc 193 is in the position shown in the full lines in Figure 3, the cam ceases to act and the spring 137 A then breaks the contact between the disc 193 and the glass tube. This contact takes place periodically, each time that the given length of tube is drawn.

The device is regulated as above indicated, by the choice of the driving pinions placed between the shaft 158 and the pinion 194 and of the inclination of the shaft of the motor 204 upon which the cutting disc 193 is mounted. In this adjustment, there is also employed the mechanism which connects the cam shaft with the glass-drawing device.

The motor 204 is supplied with current by the brushes 282 co-operating with the slip rings 196. A regulating rheostat is disposed at 186.

The disc 193 does not cut the glass tube, but it simply makes the start for a break which is then effected by the rollers 207 which serve to break off the tube and also to evacuate the detached tube (Figures 3 and 7). The said rollers are mounted in principle in the same manner as the drawing rollers 130; they have a greater thickness and diameter than the latter, and are not grooved. Since they have a larger diameter than the rollers 130, they will have a greater peripheral speed, in order to remove the cut tube while the part in the rear is still being drawn. The spring 137 B which draws back the rollers 207 is not sufficient to participate in the tube-drawing action, and it serves simply to draw forward the detached tube, slipping upon it when it is still being drawn. One of the arms 191 carrying the rollers 207 is provided with teeth engaging a pinion 211 mounted on the other arm and urged into contact with an arm 281 by a spring 212 when the rollers are brought towards the drawing axis.

To remove the glass tube, the cam 209 B acts on a lever 223 B pivoted at 208 B to a piece 206 B secured to the upright 157 (Figures 6 and 7). The lever 223 B acts on the lever 205 which impels one of the arms 191 while stretching the springs 212. The two rollers 207 act perpendicularly upon the tube, and when the cut made by the disc 193 comes opposite the stop 227 (Figures 5 and 6) the tube is detached from the back part engaged in the drawing operation. The cam 209 A now acts on the lever 223 pivoted at 208 to a member 206 secured to the upright 157. The lever 223 acts on the lever 226 carrying the stop which is so adjusted as to simply make a light contact with the tube which it retains. The tube is thus broken off, and the detached tube is drawn forward by the rollers 207 at a speed which exceeds the speed of the tube-drawing, so that it will be separated from the back tube.

Since the axes of the rollers 207 differ in height, the detached tube 283 will be inclined towards a trough or spout 239 with which it makes contact when left by the rollers. The trough 239 is so inclined that the detached tube will leave the way clear for the next tube. The detached tube, whose lower end makes contact with the right-hand roller 207 A (Figure 3) is delivered into a wood trough or spout 247 held by a strap 248 secured to the casing 243 and through which it slides into a suitable recipient, such as the box 240, lined with felt 241 so that the tube will rebound without breaking. The tubes 287, due to this precaution, will roll upon one another to one side of the said box, so as to leave a place for the tube delivered by the trough 239. The box 240 is mounted on the base members 242 upon which it may be inclined at will in all directions. It is supported at the lower part by a link provided with a ball joint 246 and by the connecting piece 244 secured to the box.

A member 156, secured to the upright 157, supports a protecting plate 213 and the wood trough 239. The said member forms a bearing for the cam shaft 158 supported at the bottom by a second bearing 141 secured to the upright 157. The cam shaft is held by a washer 190 resting on the piece 141; a wormwheel 132 C on the cam shaft, engages a worm 133 C on the shaft 229 mounted in a bearing 228 disposed on the upright 157. On the shaft 229 is mounted the pulley 62 F driven by a belt 73 B, whose diameter is a factor in the adjustment of the length of the tubes (Figure 4). The shaft 171 of the disc 147 actuates a belt 73 B which is placed upon two supporting pulleys 232 whose shaft 233 is placed at the end of a rod 231 which can slide and oscillate with reference to a support 230 mounted on the upright 157.

A screw 235 serves to lock the rod 231 when the belt is properly stretched. A handle 234 facilitates the operation. To disengage the device, it will suffice to slacken the belt, which is tightened when again engaging the device. The belt is protected against any oil from the shaft 171, by a deflecting ring or shield 236 which discharges the oil by centrifugal action.

A ladder 179 affords access to the bridge 175 secured to the platform 124 and to the stack 110 (Figure 1) by a member 176 and a collar 177. A step 249 is secured to the member 148 by a rod 155. A step 181 is provided to facilitate the access to the melting chamber. It is mounted on two brackets 183—184, and it supports a screen 182 which protects the belt.

A support 189, secured to the upright 72, carries a switchboard 188 upon which are mounted the electrical apparatus by which the machine is controlled.

What I claim is:

1. In a machine for drawing glass tubes and rods, including a crucible, a central boss within said crucible, a cooling jacket rotatable about a vertical axis and disposed above said boss, means for rotating said cooling jacket, said cooling jacket being adjustable axially with respect to said boss.

2. In a machine as in claim 1, an annular partition floatable in molten glass and surrounding said boss, a cover disc carried by the lower portion of said cooling jacket, said disc engaging the said annular partition when the cooling jacket is in one position of its axial adjustment, whereby the annular partition is caused to rotate with said cooling jacket.

In testimony whereof I have signed my name to this specification.

ROBERT SALOMON.